US012654205B2

(12) United States Patent
Qin et al.

(10) Patent No.: US 12,654,205 B2
(45) Date of Patent: Jun. 16, 2026

(54) PRESSURE WASHER

(71) Applicant: Semper Vista, Walnut, CA (US)

(72) Inventors: Qiwei Qin, Chongqing (CN); Weiyan Hu, Chongqing (CN)

(73) Assignee: Semper Vista, Walnut, CA (US)

( * ) Notice: Subject to any disclaimer, the term of this patent is extended or adjusted under 35 U.S.C. 154(b) by 0 days.

(21) Appl. No.: 19/297,698

(22) Filed: Aug. 12, 2025

(65) Prior Publication Data

US 2026/0048420 A1 Feb. 19, 2026

Related U.S. Application Data

(63) Continuation-in-part of application No. PCT/CN2024/118741, filed on Sep. 13, 2024.

(30) Foreign Application Priority Data

Aug. 14, 2024 (CN) .......................... 202411113269.0

(51) Int. Cl.
*B08B 3/02* (2006.01)
*B05B 9/04* (2006.01)

(52) U.S. Cl.
CPC .............. *B08B 3/02* (2013.01); *B05B 9/0403* (2013.01); *B08B 3/026* (2013.01); *B08B 2203/0211* (2013.01); *B08B 2203/0223* (2013.01); *B08B 2203/0235* (2013.01)

(58) Field of Classification Search
CPC ... B08B 3/02; B08B 3/026; B08B 2203/0211; B08B 2203/0235; B08B 2203/0223; B05B 9/0403
USPC .......................................................... 165/303
See application file for complete search history.

(56) References Cited

U.S. PATENT DOCUMENTS 8,161,643 B2 * 4/2012 Smith .................... H02K 5/203 29/890.03
2020/0298287 A1 * 9/2020 Dancs ........................ B60L 3/12
2021/0138511 A1 * 5/2021 Zhao ........................ F04B 17/03

FOREIGN PATENT DOCUMENTS

| | | | |
|---|---|---|---|
| CN | 108377063 | A | 8/2018 |
| CN | 109253070 | A | 1/2019 |
| CN | 109450152 | A | 3/2019 |
| CN | 110145447 | A | 8/2019 |
| CN | 213051771 | U | 4/2021 |
| CN | 119103213 | A | 12/2024 |

(Continued)

*Primary Examiner* — Joel M Attey
(74) *Attorney, Agent, or Firm* — DANE IP Law PC

(57) ABSTRACT

A pressure washer is provided in which the low-pressure water supplied to the unit is routed through thermally conductive channels in the housing to absorb heat generated by the motor and electronics before being pressurized for cleaning. The channels are arranged in a serpentine configuration around the motor, with optional cavities in the end caps to increase heat transfer surface area and improve cooling efficiency. Heat from the motor is transferred to the housing and into the water, while heat from the electronics is conducted to the second end cap and into the same water flow. The heated water is then delivered to the pump, where it is pressurized for discharge through the outlet. This design enables efficient cooling of the motor and electronics using the pressurized water, eliminating the need for a separate cooling system.

16 Claims, 14 Drawing Sheets

(56) References Cited

FOREIGN PATENT DOCUMENTS

| | | |
|---|---|---|
| JP | 2023028526 A | 3/2023 |

* cited by examiner

PRESSURE WASHER

CROSS REFERENCE TO RELATED APPLICATIONS

This application claims priority to PCT App. Ser. No. PCT/CN2024/118741, filed on Sep. 13, 2024, which claims priority to patent application serial number 2024111132690, filed on Aug. 14, 2024 with the CNIPA, the entire contents of which are expressly incorporated herein by reference.

STATEMENT RE: FEDERALLY SPONSORED RESEARCH/DEVELOPMENT

Not Applicable.

BACKGROUND

The various aspects and embodiments described herein relate to pressure washers.

Pressure washers are commonly used in residential, commercial, and industrial settings to deliver high-pressure water for cleaning surfaces such as vehicles, buildings, equipment, and pavement. These machines typically include a motor to drive a pump that pressurizes incoming water, along with associated control electronics to regulate operation. During extended use, both the motor and the electronics can generate significant amounts of heat, which, if not effectively dissipated, can reduce performance, shorten component life, or lead to overheating failures. Unfortunately, there are problems in the current approaches to cooling.

As such, there is therefore a need for an improved pressure washer.

BRIEF SUMMARY

A pressure washer is provided in which low-pressure water, which is subsequently pressurized to a high pressure for cleaning, is first directed through channels in the housing to absorb and remove heat generated by the motor and the electronics. The housing is fabricated from a thermally conductive material, and the channels are arranged in a serpentine configuration around the motor so that water flows back and forth across the housing surface, transferring heat away before being discharged at high pressure. Optional cavities in the end caps enhance surface area and improve heat transfer efficiency, allowing the system to cool both the motor and the electronics without separate cooling components.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
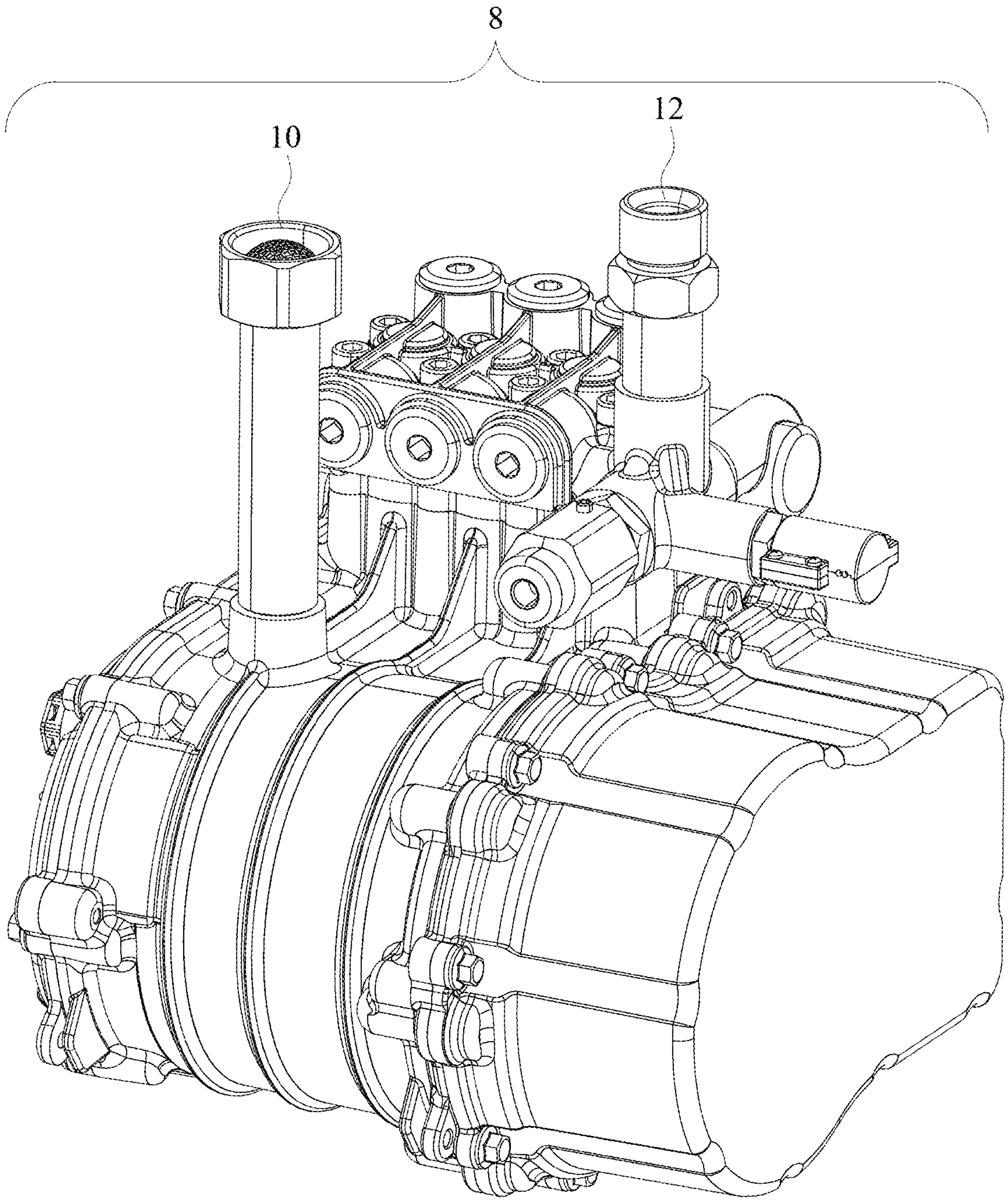
FIG. 1 illustrates a perspective view of the pressure washer showing a water inlet and a water outlet.

Referring to FIG. 1, the pressure washer 8 includes a main motor housing 14 containing a motor within an internal cavity 62 sealed by a first end cap 16 and a second end cap 18. Low-pressure water enters through inlet 10 and is routed into a series of flow channels 22, 24, 26, 28, 30 formed in the outer portion of the housing 14. These channels are arranged in a serpentine pattern so that the water flows back and forth across the housing, first in one direction and then in the opposite direction via optional return channels 36, 38, 40, 42 formed in one or both of the end caps 16, 18. As the motor operates, heat is transferred from the motor to the thermally conductive housing 14, and then from the housing walls into the flowing low-pressure water. In addition, electronic components which operate the pressure washer 8 which are mounted to the second end cap 18 are thermally coupled to the end cap via heat-conductive plates 76 or conduits, allowing heat from the electronics to be transferred to the same water flow. After absorbing heat from both the motor and the electronics, the water is directed to a pump within the pressure washer, where it is pressurized to a high pressure for cleaning applications and discharged through outlet 12.

The pressure washer 8 includes a thermally conductive housing 14 (see FIG. 2) that surrounds and protects a motor while enabling heat transfer from the motor to water that flows along the outer portion of the housing 14. Referring now to FIG. 1, the system includes a water inlet 10 for receiving pressurized water and a water outlet 12 for discharging water after it has passed through the internal flow circuit. The central portion of the system includes a main motor housing 14, which is cylindrical and defines an internal cavity 62 (see FIG. 5B) that receives the motor. The main motor housing 14 is fabricated from a material having a high coefficient of heat transfer (e.g., aluminum) so that heat generated by the motor is conducted into the outer portion of the housing 14 and then into the water flowing in the outer portion of the housing 14.

Figure 2:
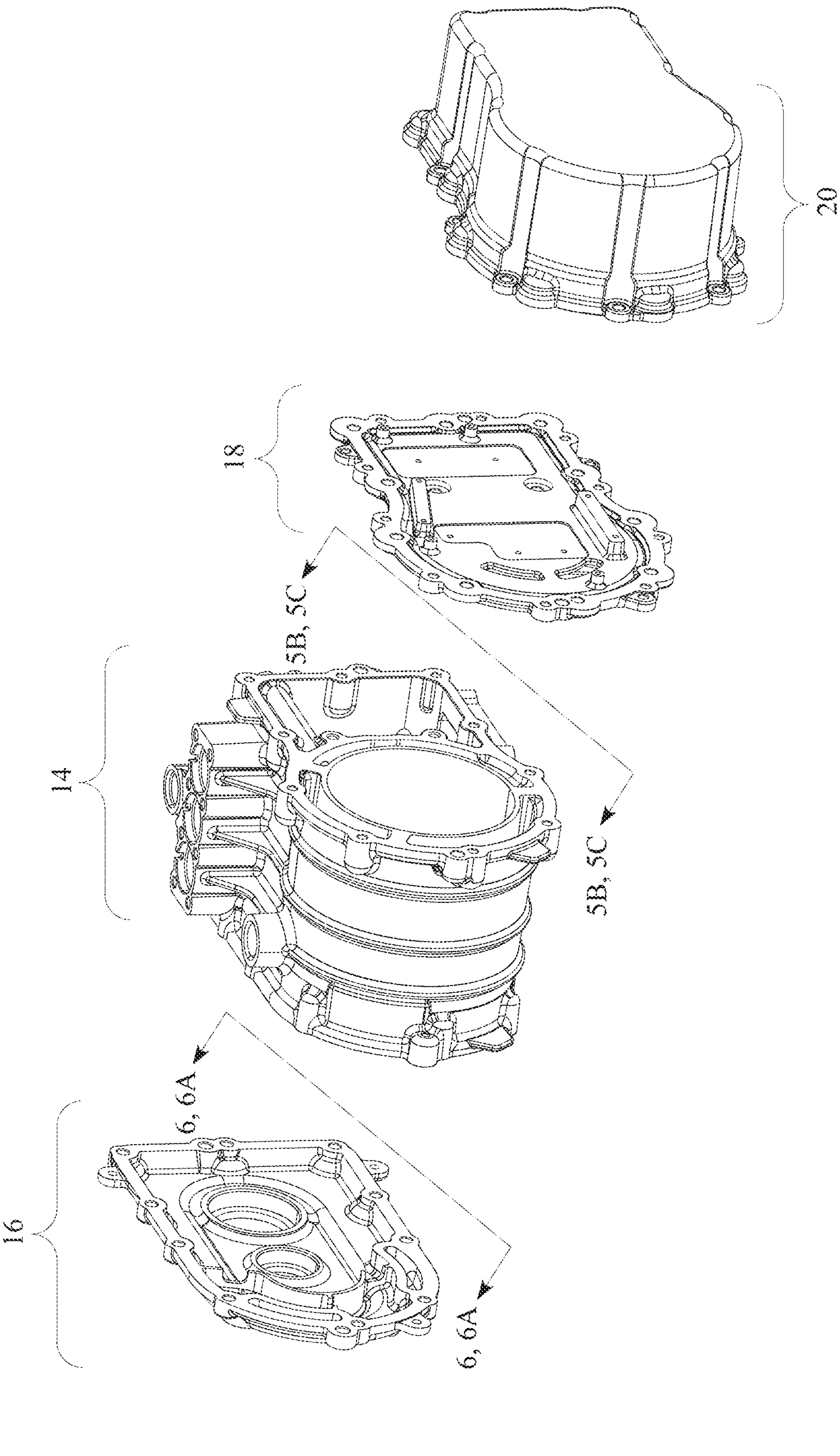
FIG. 2 illustrates an exploded right side perspective view of the pressure washer showing the cylindrical main motor housing, a first end cap, a second end cap at opposite ends and a cover for the electronics.
Figure 3:
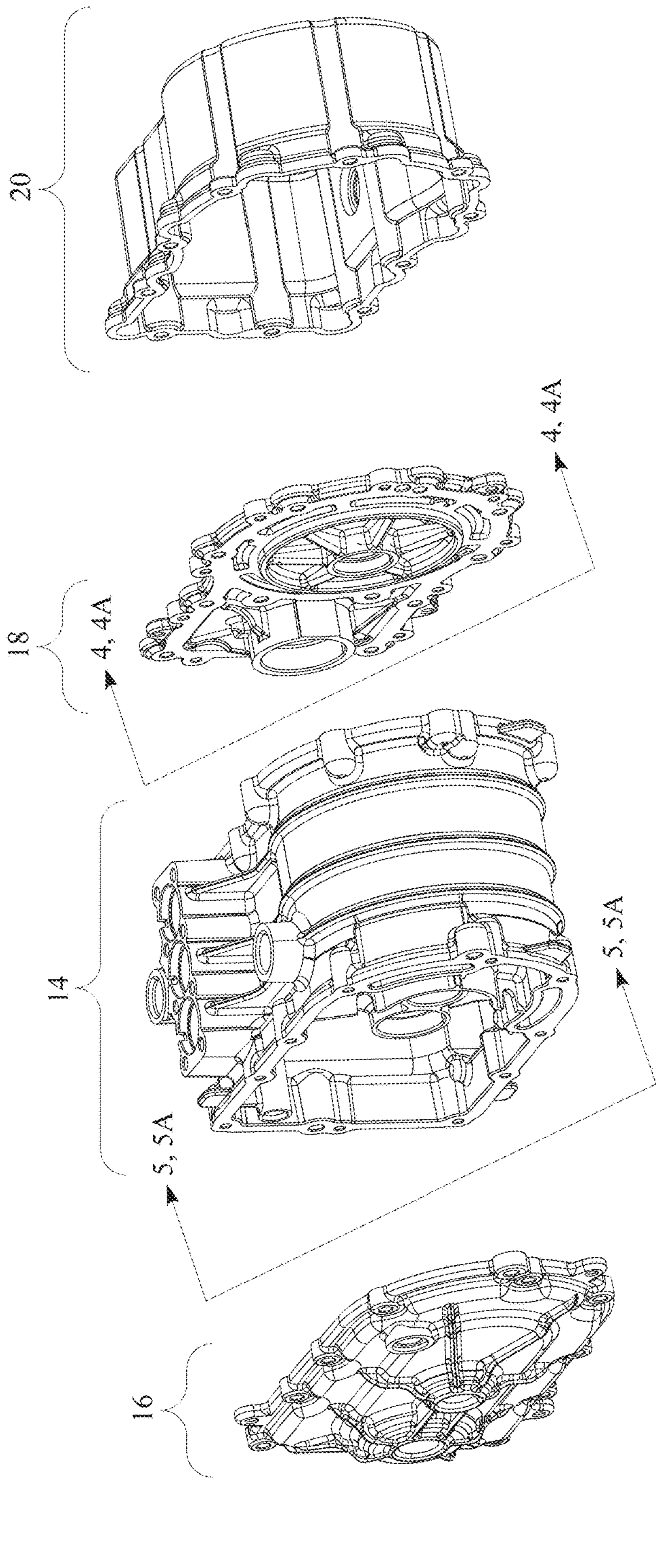
FIG. 3 illustrates a left side perspective view of the pressure washer shown in FIG. 2.
Figure 7:
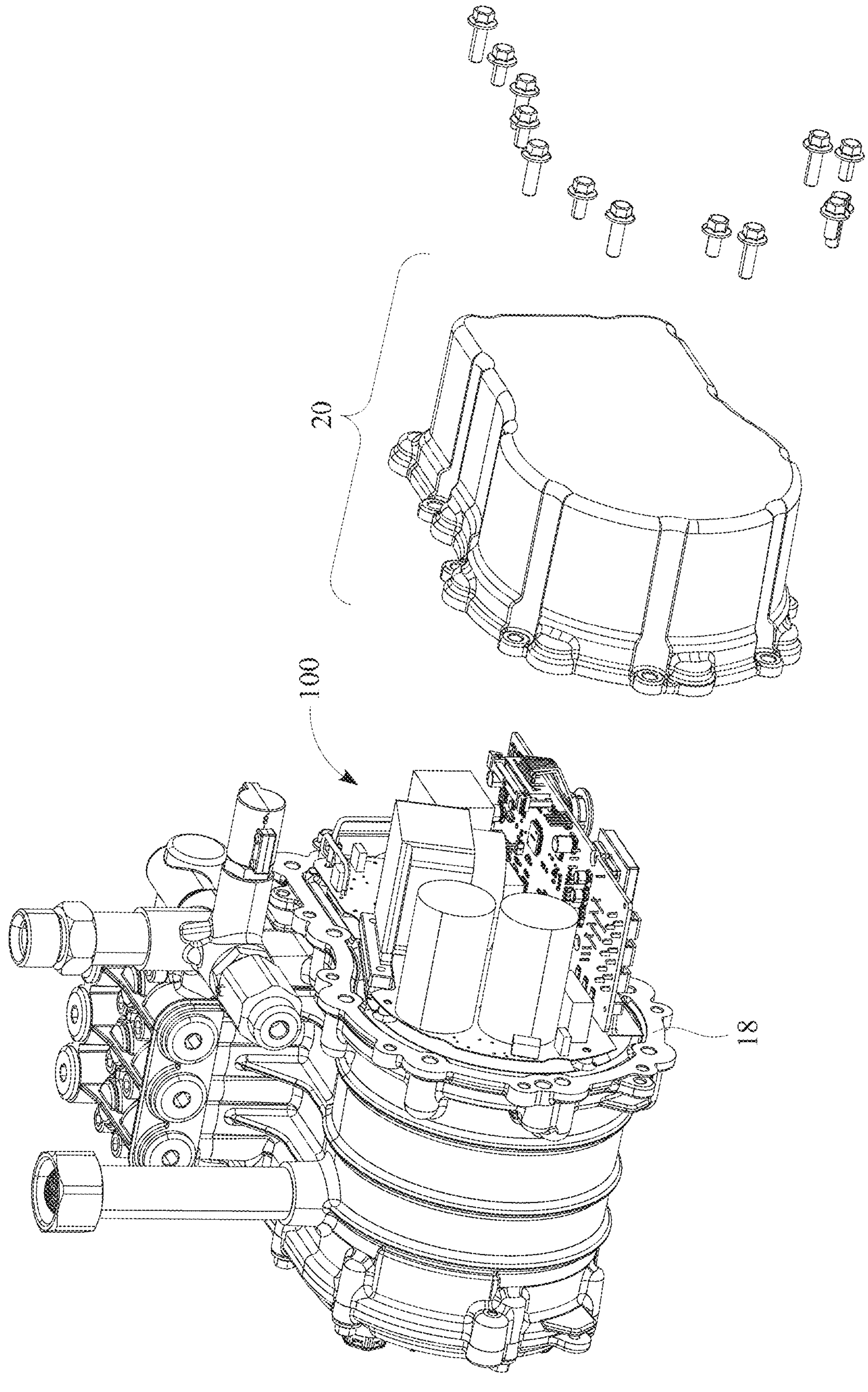
FIG. 7 illustrates a partial exploded view of the pressure washer showing the positioning of the electronic components relative to the second end cap and a cover for the electronics.

The cavity 62 is enclosed at opposite ends by a first end cap 16 and a second end cap 18, shown in FIGS. 2 and 3. These end caps 16, 18 are mechanically fastened to the motor housing 14, such as by bolts threaded into the housing through bolt holes in the end caps as shown in FIG. 7. The result is a hermetically sealed motor compartment that prevents water from entering and damaging the motor. The hermetically sealed motor compartment is defined by the cavity 62 and the first and second end caps 16, 18. The outer portion of the motor housing 14 and the second end cap 18 serve as the heat transfer interface from the motor and electronic components to the water flowing through the outer portion of the housing 14.

Figure 5:
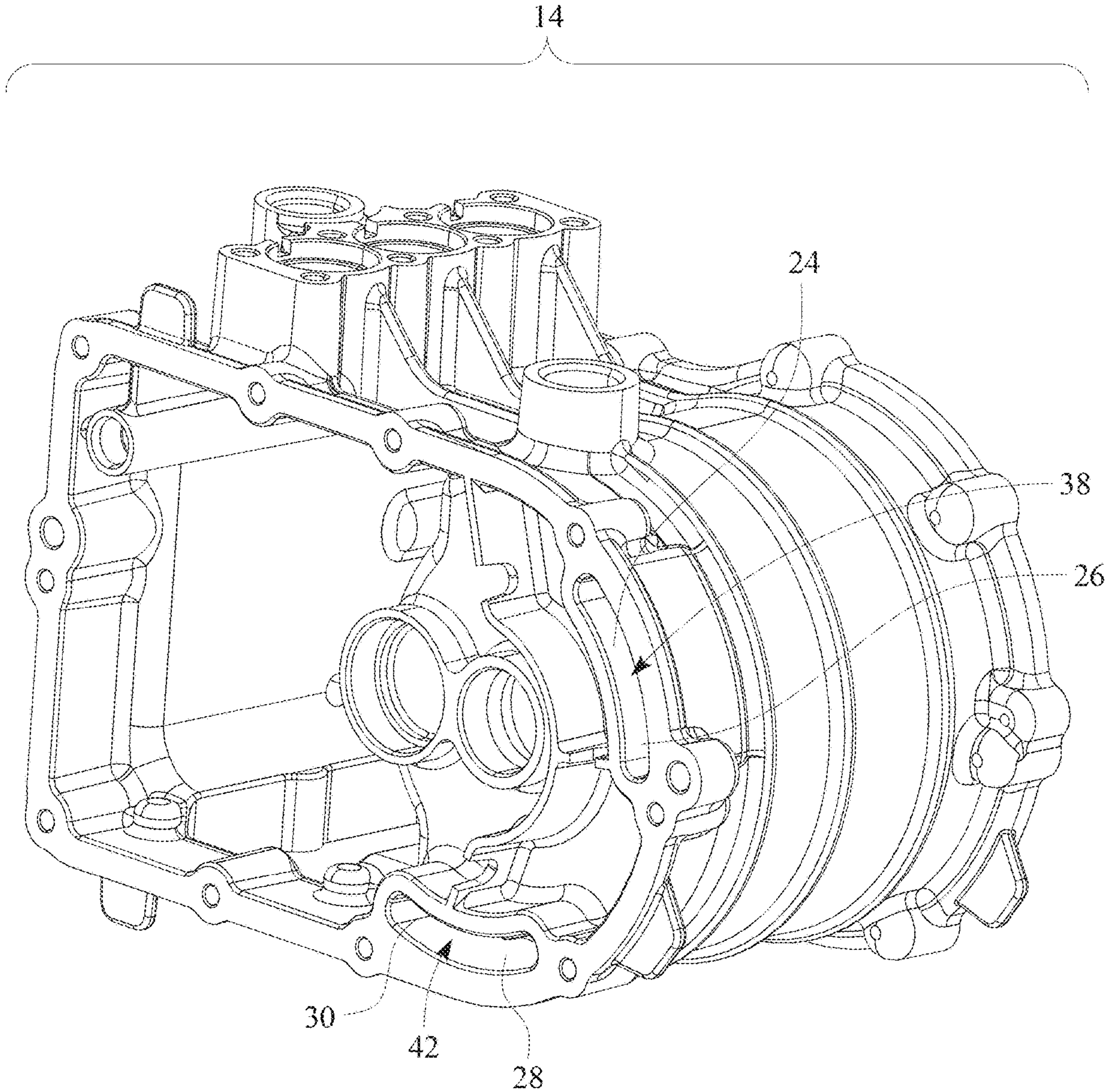
FIG. 5 illustrates a left side perspective view of the housing showing an arrangement of the flow channels around the motor housing, including multiple longitudinal channels and return channels that redirect the flow.
Figure 5A:
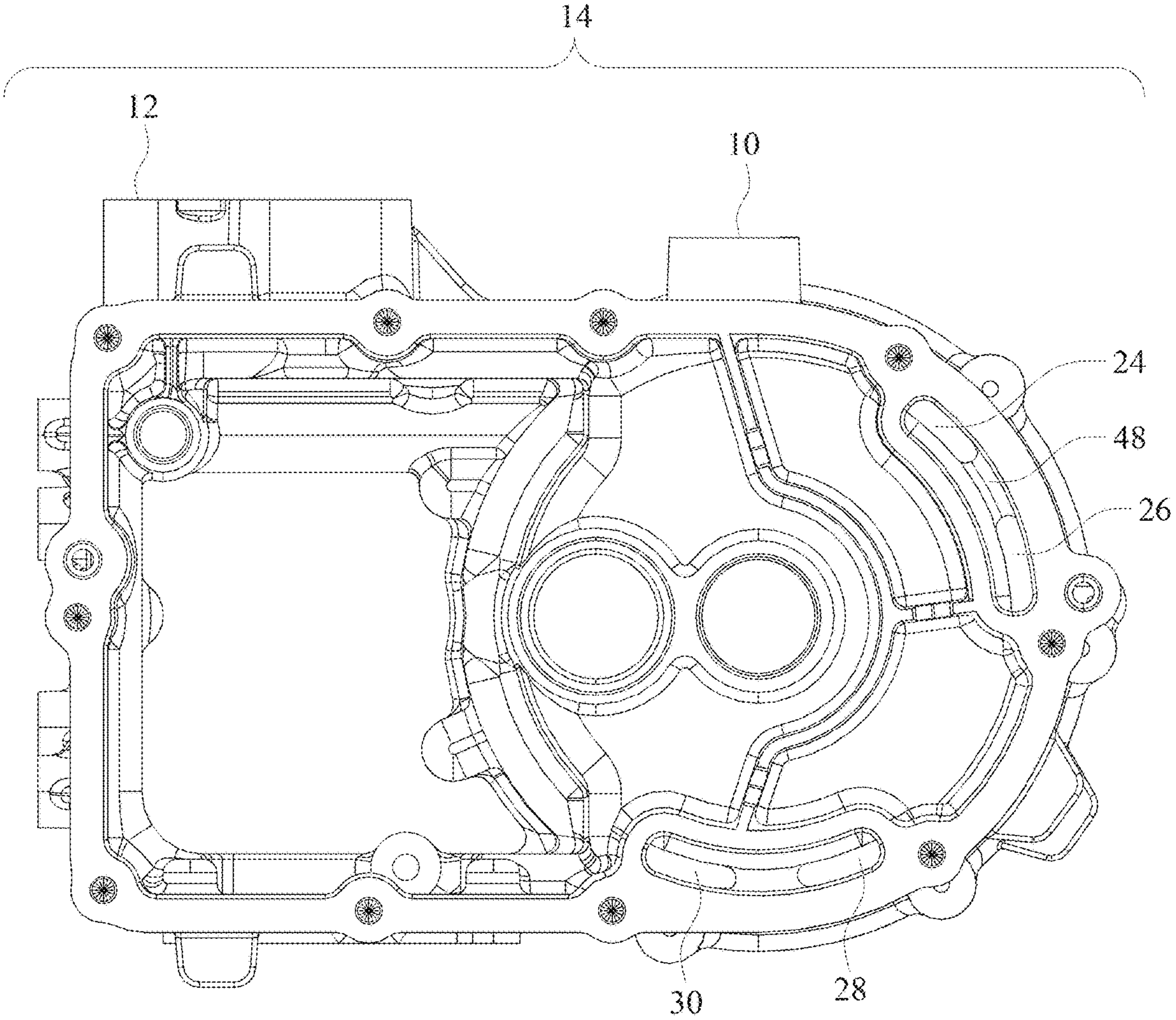
FIG. 5A illustrates a left side view of the housing shown in FIG. 5.
Figure 5B:
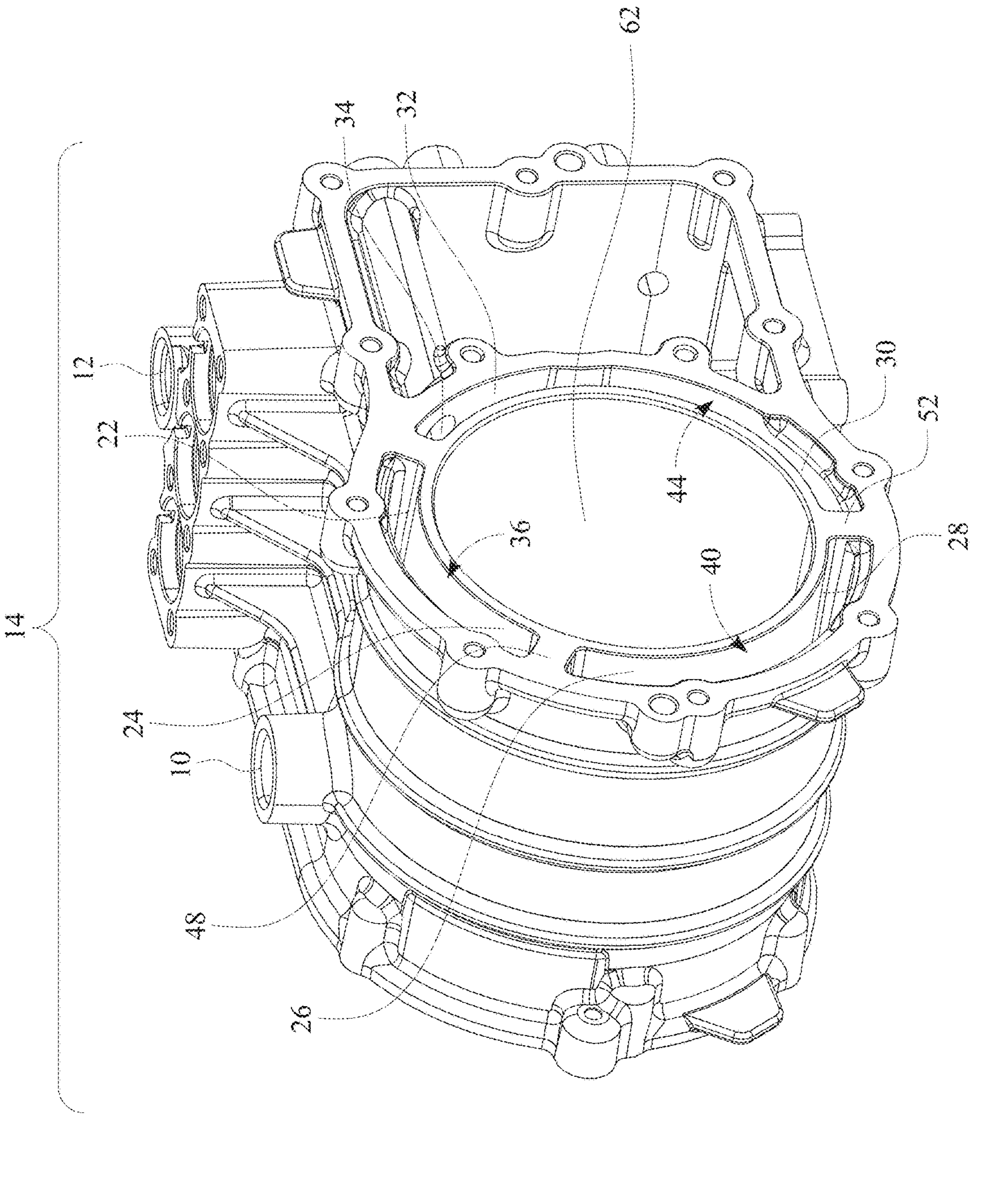
FIG. 5B illustrates a right side view of the housing showing an arrangement of the flow channels around the motor housing, including multiple longitudinal channels and return channels that redirect the flow.
Figure 5C:
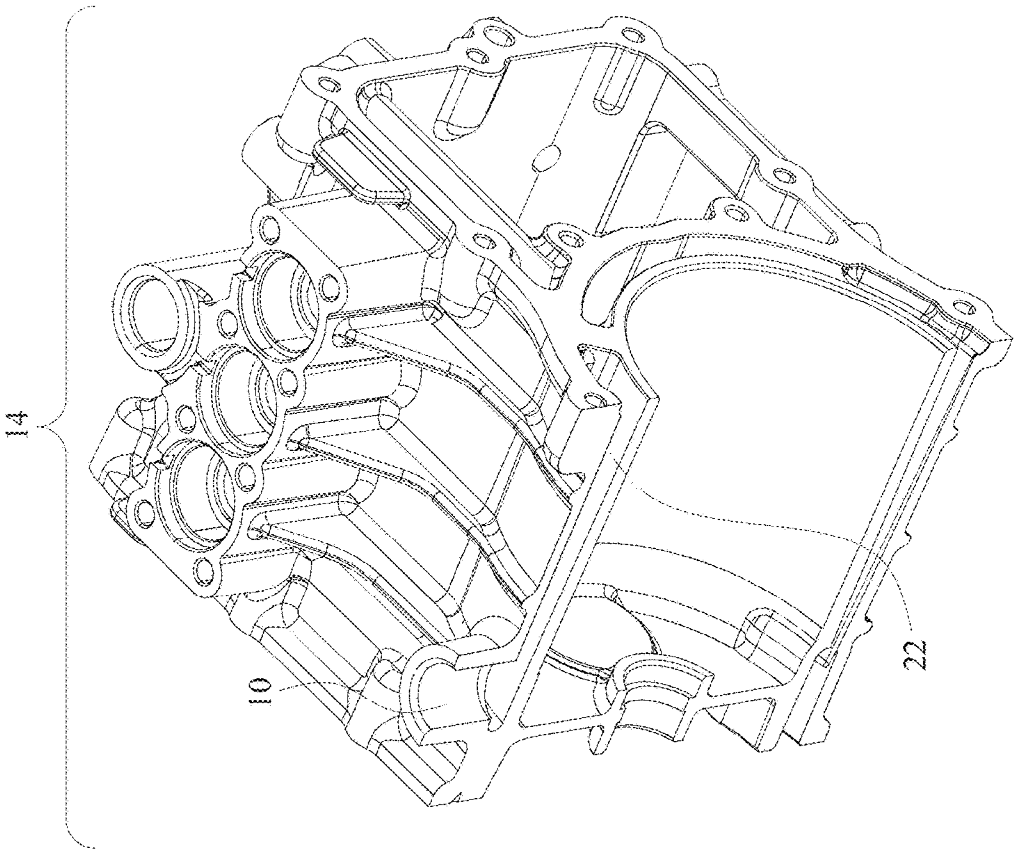
FIG. 5C illustrates the inlet in fluid communication with the first channel, showing a first direction of water flow along the main motor housing toward the second end cap.
Figure 5D:
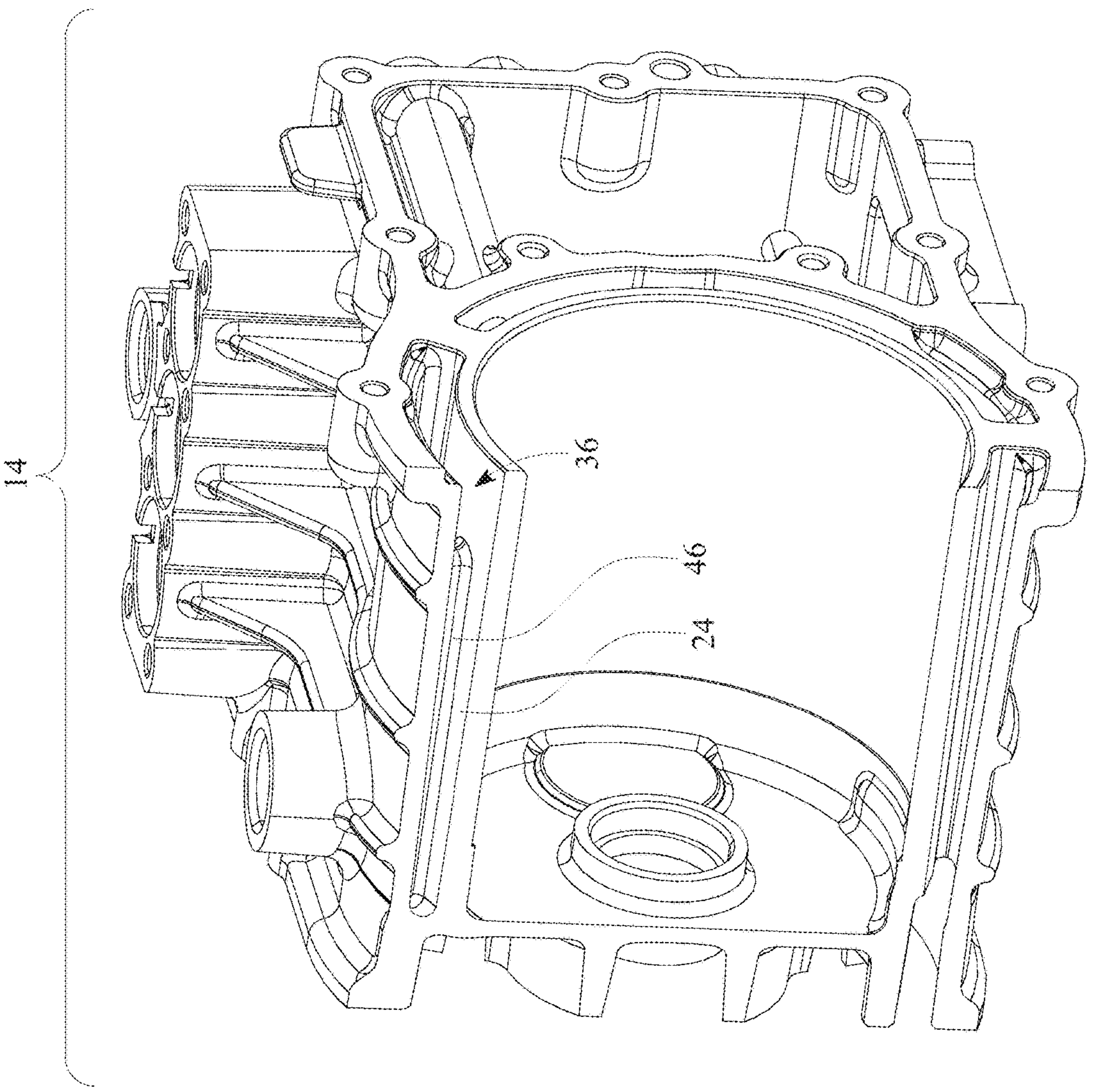
FIG. 5D illustrates a right side view of the housing and a wall between the first channel and second channel wherein the wall terminates short of the second end cap to allow water to turn into the return channel to flow water through the second channel.

Turning to FIG. 5C, incoming water from the inlet 10 enters a first longitudinal flow channel 22, which runs along the outer portion of the motor housing 14 in a first direction (left to right in the figure). The first channel 22 is bounded by walls projecting from within the outer portion of the motor housing. At the downstream end of the channel, the walls stop short of the distal end of the housing and do not fully reach the inner face of the second end cap 18. This gap allows the water to flow around the end of the wall structure and reverse direction into an adjacent second channel 24, shown in FIGS. 5B and 5D. The water then flows in the second direction (right to left), forming the first reversal in a serpentine path.

Figure 4:
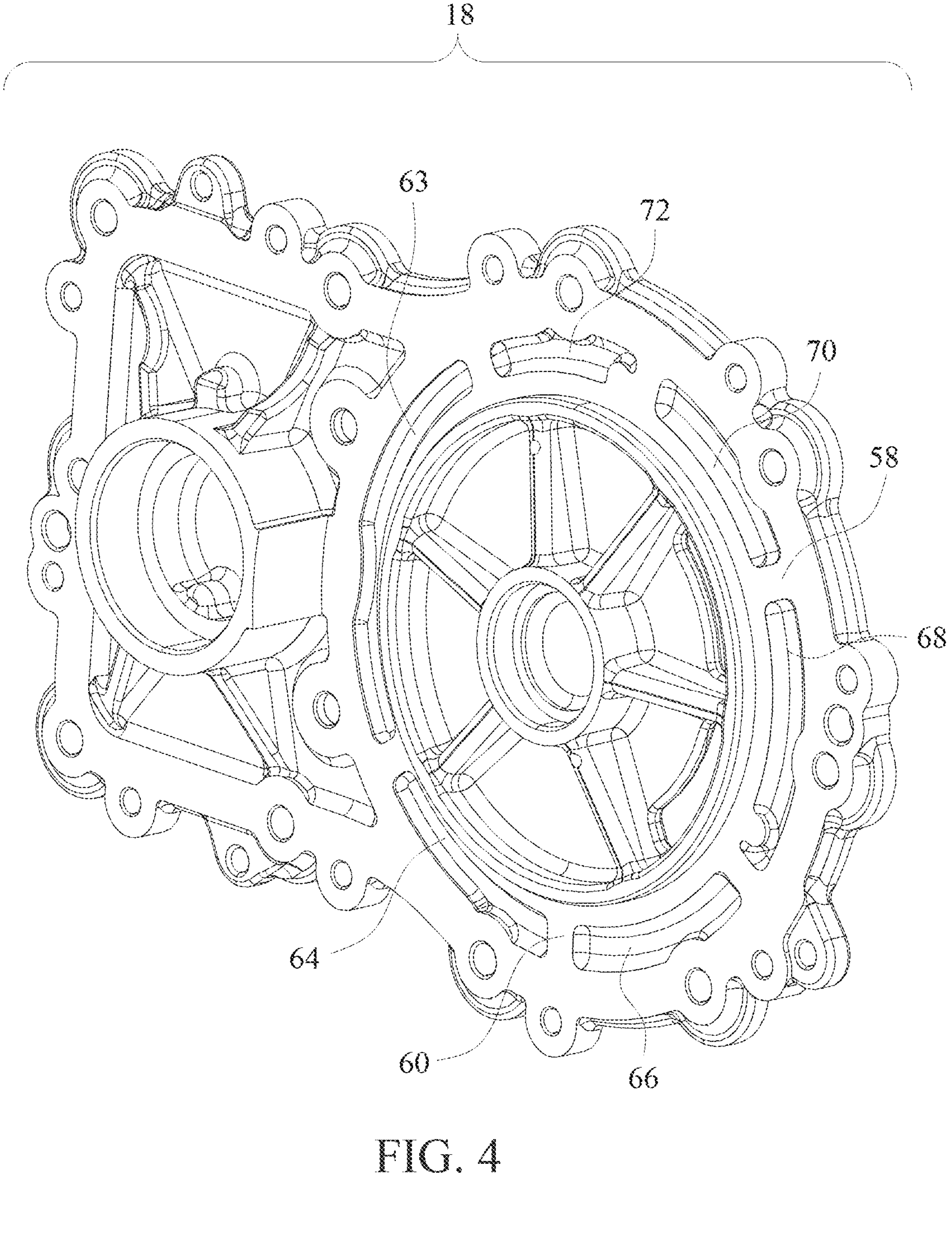
FIG. 4 illustrates a left perspectivew view of the second end cap showing cavities positioned at return channel regions, as well as mating surfaces for blocking water flow between certain channels.

The interface between channel 22 and channel 24 occurs at a location known as a return region, and in some embodiments, optional cavities 70 and 72 (see FIG. 4) may be formed in the second end cap 18 at this region to increase surface area and facilitate heat transfer. These cavities 70, 72 are shaped to mate with the adjacent channels 22, 24 and may partially define a first return 36. However, these cavities 70, 72 are not required for flow reversal. Because the wall between channels 22 and 24 do not need to extend all the way to the end cap 18, a return path (i.e., first return 36) is naturally formed by the small open space between the end of the wall 46 (see FIG. 5D) and the end cap 18, allowing the water to turn and enter the adjacent channel without the need for molded cavities 70, 72.

The water then flows through second channel 24 and again reaches the end of its path. At this second return 38, water reverses direction from second channel 24 into third channel 26. As with the first return region, the wall 48 between the channels 24, 26 stop short of the distal end, leaving an open region 38 (i.e., second return) to permit the flow to turn and flow in the opposite direction. The water then flows through the third channel 26 and again reaches the end of its path. At the next return location 40 (i.e., third return), water reverses direction from the third channel 26 into the fourth channel 28. Optionally, cavities 66 and 68 may be formed in the end cap 18 to receive the water and increase thermal contact between the end cap and the water. These cavities may partially define the third return 40, shown in FIG. 5B.

Figure 5E:
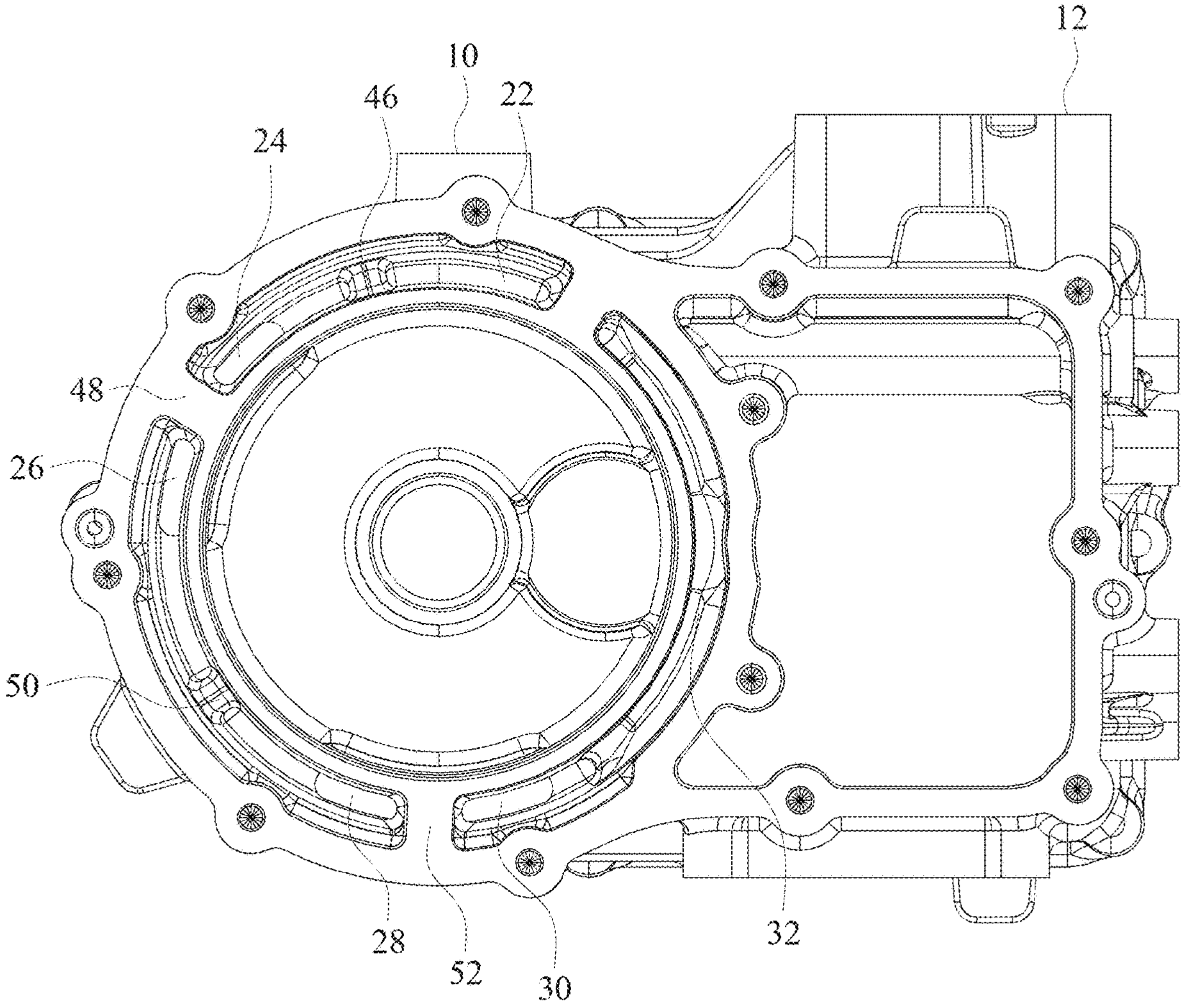
FIG. 5E illustrates a right side view of the housing showing walls that define the channels, including walls between adjacent channels, with the open ends of the walls allowing water to reverse direction between channels.

The water continues in this back-and-forth pattern through fourth channel 28 and fifth channel 30 at return 42 (see FIG. 5). Between each pair of adjacent channels, a similar return structure is present. FIGS. 5B and 5E show that between third channel 26 and fourth channel 28, a third return channel 40 is formed, and between fourth channel 28 and fifth channel 30, a third return channel 40 is formed. As before, these returns may rely solely on the space between shortened walls and the end cap, or they may optionally include cavities—such as cavity 66 and cavity 68 in the second end cap 18 to enhance heat transfer by providing additional wetted surface area.

FIG. 5E illustrates the structure of the walls that define the channels. First wall 46 separates channels 22 and 24; second wall 48 separates channels 24 and 26; third wall 50 separates channels 26 and 28; and fourth wall 52 separates channels 28 and 30. Each wall extends longitudinally from one end of the motor housing toward the other but terminates short of the very end of the housing to leave room for the water to reverse flow at the return locations. This termination design eliminates the need for complex manifold routing or cross-drilled passages and simplifies manufacturing. Cavities are not required in the end caps 16, 18 but may be formed to facilitate the return of water flow in the opposite direction.

Figure 6:
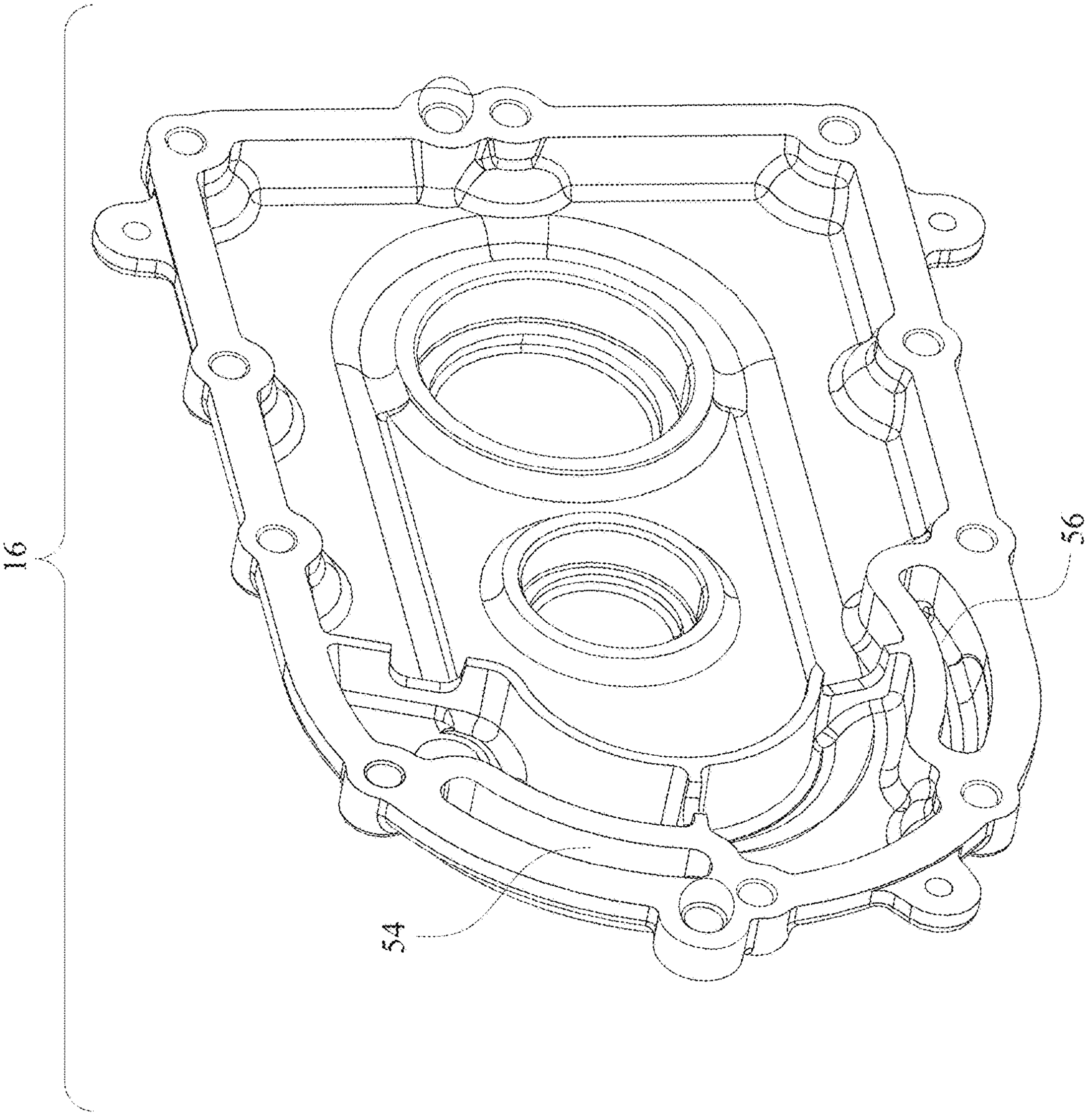
FIG. 6 illustrates a right side perspective view of the first end cap showing the arrangement of pockets for helping turn the water from from a second direction to a first direction.

In some embodiments, the first end cap 16 may also include return channel cavities to assist with flow reversal. FIG. 6 shows optional pockets 54 and 56 formed in the first end cap 16. Pocket 54 interfaces with the second and third channels 24 and 26 to define the second return region, while pocket 56 interfaces with the fourth and fifth channels 28 and 30. These pockets, like the cavities in the second end cap, are optional and serve to increase the contact surface area between the water and the thermally conductive material of the end cap.

After completing its passage through the fifth channel 30, the water enters a connecting channel 44, shown in FIG. 5B, which routes the flow into a sixth channel 32 and then a seventh channel 34. Cavities 64 and 63 formed in the end cap 18 may be used to facilitate heat transfer by increasing surface area in which the water is in contact with the end cap 18. The seventh channel 34 is in fluid communication with the outlet 12, as seen in FIGS. 1 and 5B. The outlet 12 may be connected to a nozzle or other output attachment, and by this stage, the water has absorbed a significant amount of heat from the motor and housing surfaces.

Through this series of flow channels, return paths, and optional end cap cavities, the system forms a continuous serpentine flow path that forces the water to snake back and forth across the outer portion of the motor housing. The design takes advantage of the high thermal conductivity of the housing material, the surface area of the channel walls, and the flow path geometry to maximize heat transfer from the motor into the water. The open-ended design of the channel walls, which leave room for directional reversal without requiring molded return cavities, allows for both flexibility in design and ease of manufacturing. Together, these features provide a simple, robust, and efficient mechanism for extracting heat from the motor during operation and expelling that heat through the water that exits the system.

The pressure washer also includes electronic components that generate a heat which needs to be removed for proper functioning of the pressure washer. The electronic components are mounted adjacent to the motor and are configured to control or support various functions of the device. These components generate heat during operation, and the system is designed to transfer that heat into the second end cap 18, which in turn is cooled by the water flowing through nearby channels and cavities. The second end cap 18 thus serves as a passive heat sink for the electronic components, enabling efficient heat dissipation without the need for fans or active cooling systems.

Figure 8:
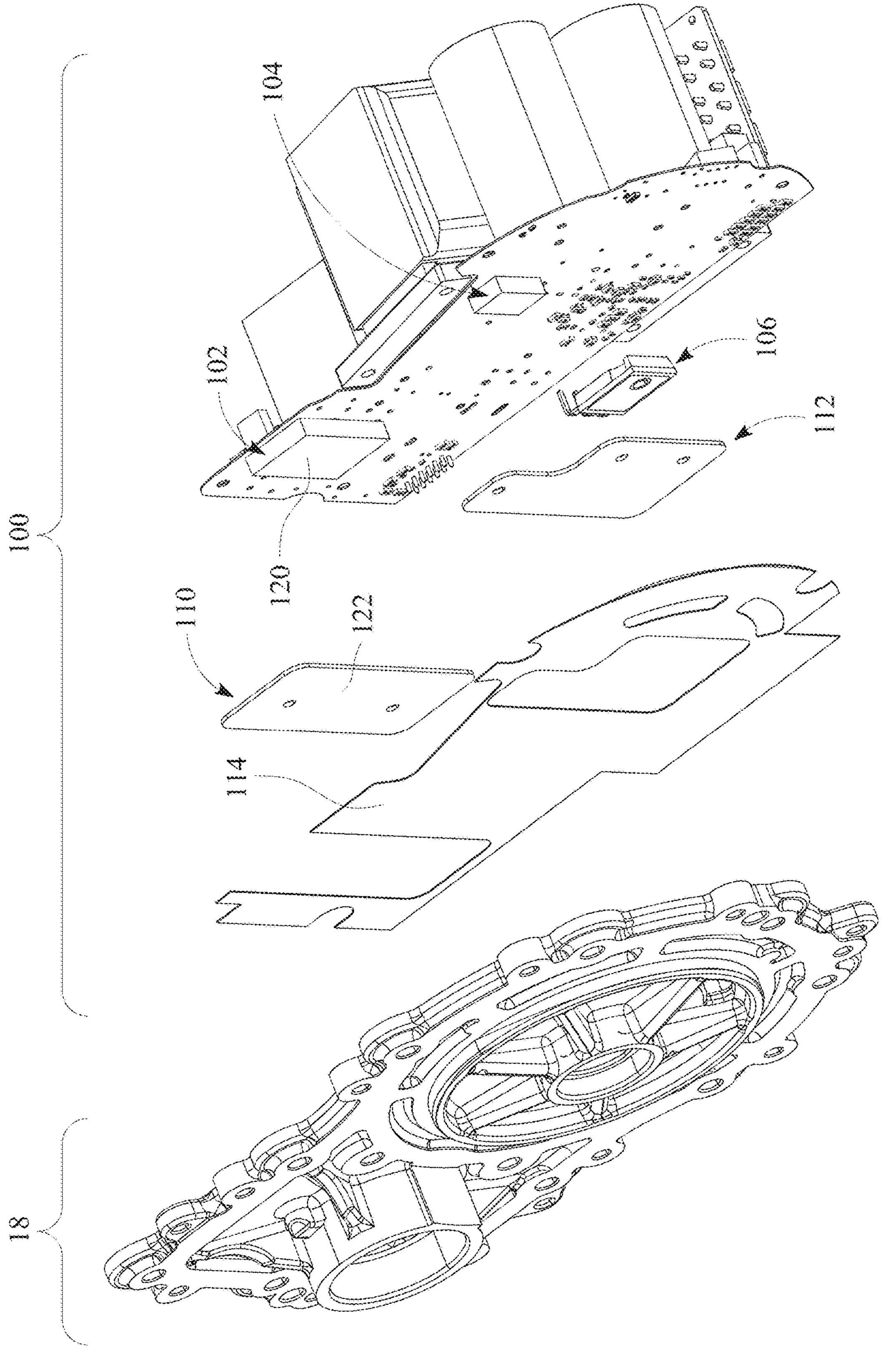
FIG. 8 illustrates a detailed view of electronic components mounted to a circuit board parallel to the second end cap, with heat-conductive plates transferring heat from the components to the end cap.

Referring to FIGS. 7 and 8, the electronic components 100 are mounted on two printed circuit boards—printed circuit board 98 and printed circuit board 96. Printed circuit board 98 is oriented parallel to the second end cap 18, while printed circuit board 96 is oriented perpendicular to it. Various heat-generating components are mounted to these boards, including a first electronic component 102, a second electronic component 104, a third electronic component 106, and a fourth electronic component 108.

The first electronic component 102 may be a chip mounted to printed circuit board 98. The top surface 120 of the first chip 102 is placed in direct physical contact with the bottom surface 118 of a heat-conductive plate 110. This contact interface may include thermal conductive grease disposed between surfaces 118 and 120 to improve the thermal interface and minimize thermal resistance. The upper surface 122 of the plate 110 is positioned in flush contact with a flat surface 124 formed on the interior face of the second end cap 18. As the chip 102 generates heat, the heat is conducted vertically through the plate 110 and into the second end cap 18. The conductive pathway from chip to plate to end cap allows for efficient heat removal.

The second and third electronic components 104 and 106 are also mounted to printed circuit board 98 and are thermally coupled to the second end cap 18 in a manner similar to that of the first chip 102. These components 102, 104 each have their own dedicated conductive plates 110 and 112, respectively, which are in flush contact with the top surfaces of the components and the exterior face of the second end cap 18. Plates 110, 112 may also include thermal grease at the interface points to enhance heat transfer.

Figure 9:
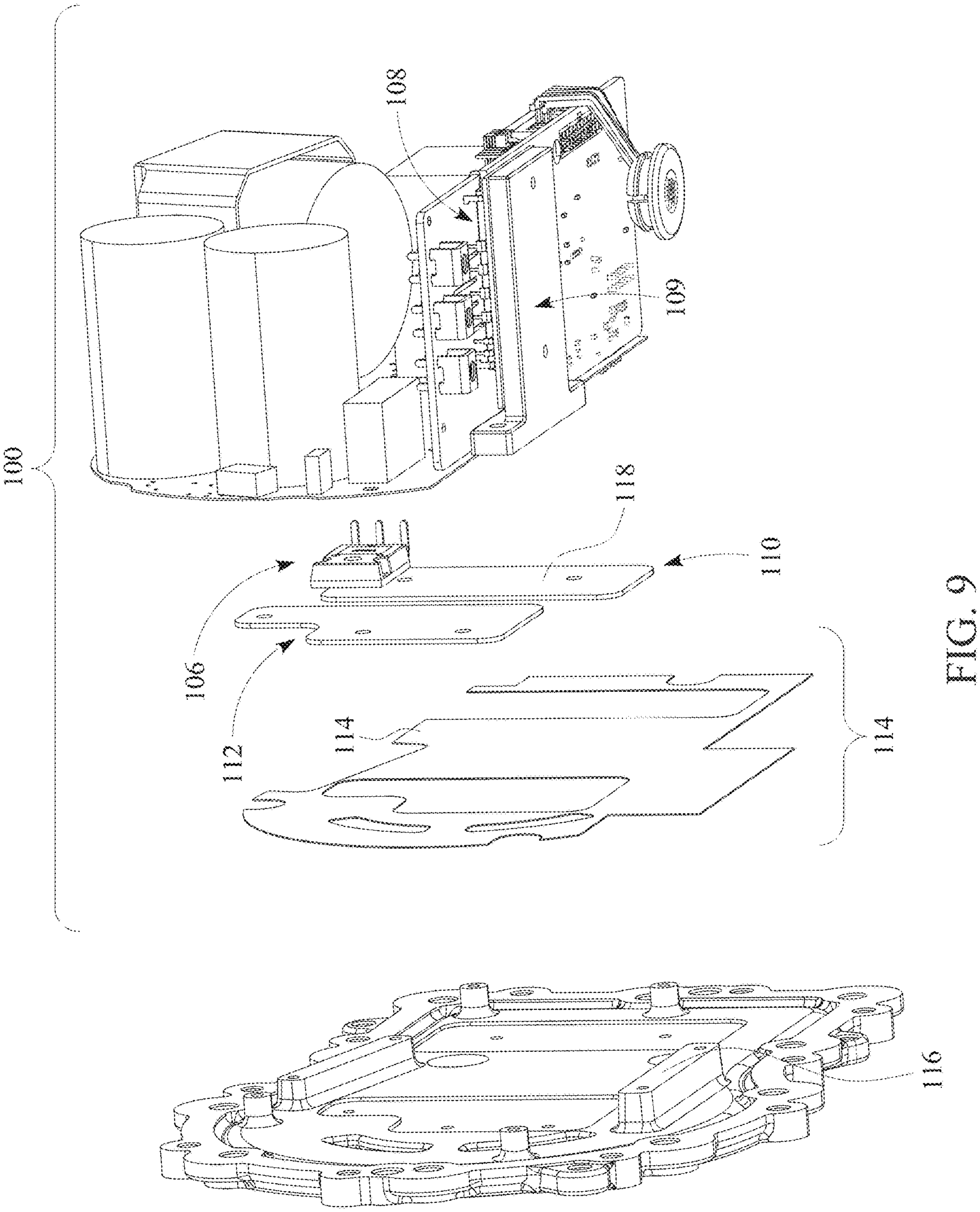
FIG. 9 illustrates a detailed view of electronic components mounted to a circuit board perpendicular to the second end cap, with heat conduits transferring heat from the components to the end cap.

The fourth electronic component 108 is mounted to the perpendicular printed circuit board 96, as shown in FIG. 9. This component 108 transfers heat to the second end cap 18 through a different structural pathway. The bottom surface of the fourth component 108 is in direct contact with the top surface of a fourth heat conduit 109, which is also referred to as a mounting block or thermal plate. The upper surface of the fourth heat conduit 109 is secured to a mounting pad 116 formed on the exterior surface of the second end cap 18. The heat generated by the fourth component 108 is conducted downward through the fourth heat conduit and into the second end cap. The heat conduit may be attached to the mounting pad using screws, adhesives, or other thermal interface methods that ensure physical and thermal coupling.

The second end cap 18 is formed from a thermally conductive material (e.g., aluminum) that allows heat to be spread across its structure and into adjacent surfaces (e.g., surfaces of the housing 14) that are in contact with the cooling water. As described in connection with FIGS. 4 and 5B, the second end cap includes several cavities—such as cavities 63, 64, 66, 68, 70, and 72—which are positioned at the return regions of the water channels. As water flows through these cavities during its path from one longitudinal channel to the next, it contacts the surfaces of the second end cap and removes heat that has been absorbed from the electronic components. In this way, the heat generated by each of the electronic components 102, 104, 106, and 108 is conducted into the second end cap and then transferred into the water that is simultaneously cooling the motor housing.

By integrating the electronic component mounting, heat conduits, and end cap geometry into the cooling loop, the system ensures that both the motor and the electronics are passively cooled by the same circulating water flow. The positioning of the components, the alignment of their heat-transfer plates, and the incorporation of thermally active cavities in the end cap all work in concert to manage thermal load during operation. This design provides robust and reliable thermal management without the complexity of separate cooling circuits or moving parts.

A method of cooling a motor in a pressure washer involves directing the flow of water along internal channels formed in the thermally conductive housing in a serpentine path to absorb heat generated by the motor and carry it away through an outlet 12. This method begins by enclosing the motor within a cylindrical main motor housing, such as that shown in FIG. 2, where the motor is positioned within an internal cavity defined by the housing 14. The motor is installed centrally in the cavity 62 and is fully enclosed by attaching a first end cap 16 to one end of the housing and a second end cap 18 to the opposite end, as seen in FIGS. 2 and 3. These end caps are mechanically fastened to the housing using bolts, which pass through bolt holes in the end caps and engage with threaded holes in the motor housing. This structure forms a hermetically sealed chamber that isolates the motor from any water flowing around it.

Once the motor is enclosed, water is introduced into the system through a water inlet 10, as shown in FIG. 1. The inlet 10 is connected to an external low pressure water source such as a garden hose. From the inlet 10, the water enters a first longitudinal flow channel 22, which runs along the outer portion of the main motor housing 14. This first channel is defined by a wall formed internally within an outer portion of the housing 14. The first wall 46 separates the first channel 22 from the adjacent second channel 24, as illustrated in FIGS. 5C and 5E.

Water flows in a first direction along the first channel 22, toward the right side of the page in FIG. 5C. As the water approaches the end of the first channel, the wall 46 does not extend all the way to the end of the housing. Instead, the walls terminate short of the distal edge, leaving an open space. This space allows the water to turn and flow into the adjacent second channel 24, reversing direction without the need for additional tubing or valves. This reversal region constitutes a return channel, in this case identified as return channel 36 in FIGS. 5B and 5D. In some embodiments, the return channel includes optional molded cavities 70 and 72 formed in the second end cap 18. These cavities increase the internal surface area for water contact, facilitating additional heat transfer from the end cap into the water. However, the cavities are not required for the reversal function, which may be achieved solely by the open spacing between the end of the wall 46 and the interior face of the end cap 18.

After reversing direction, the water flows along second channel 24, which runs in the opposite direction (right to left) and is bounded by walls 46 and 48. At the end of the second channel, the water again turns via a second return channel 38 into third channel 26. This channel runs in the original direction (left to right) and is defined between walls 48 and 50. The sequence continues with water flowing through third return channel 40 into fourth channel 28, and then through fourth return channel 42 into fifth channel 30, as shown in FIGS. 5, 5A, 5B, and 5E. The direction of flow alternates between each adjacent pair of channels, forming a serpentine path that causes the water to snake back and forth across the length of the motor housing multiple times.

Each return channel is formed by the combination of open-ended flow walls and, optionally, cavities molded into the first end cap 16 or second end cap 18. For example, first pocket 54 in FIG. 6 is formed in the first end cap 16 and assists in redirecting water from second channel 24 to third channel 26, while second pocket 56 assists with the transition from fourth channel 28 to fifth channel 30. These pockets are also optional and serve to expand the volume and surface area available for thermal exchange during the turnarounds.

The motor housed inside cavity 62 generates heat during operation. This heat is transferred outward from the motor to the water flowing in the channels of the motor housing 14. Because the housing is fabricated from a thermally conductive material, such as aluminum, the heat is conducted through the housing wall toward the water flowing through the channels, where the heat is transferred into the flowing water. As the water travels through each of the longitudinal channels, it absorbs heat from the surrounding surfaces of the channels. The alternating flow pattern increases the effective length of water-housing contact and maximizes heat exchange. The arrangement of the flow channels and return channels ensures that more than 50% of the circumferences of the motor housing is contacted by water flow at some point along the path.

Once the water completes its final pass along the housing—in this case through fifth channel 30—it flows through a connecting channel 44 (see FIG. 5B) into sixth channel 32 and then into a final discharge path in seventh channel 34, as shown in FIG. 5B. The water then exits the pressure washer through outlet 12, seen in FIGS. 1 and 5A. By the time the water reaches the outlet, it has absorbed a substantial portion of the heat conducted through the housing from the motor.

This method provides a passive and highly efficient way to cool the motor using the same water that will ultimately be expelled through the outlet under high pressure. The structure of the housing, the use of walls to form parallel flow paths, the alternating directions of flow, and the use of optional return cavities all contribute to a compact and effective thermal management system. Through this step-by-step routing, the method ensures that heat generated by the motor is steadily transferred into the water and removed from the pressure washer during normal operation.

A method of cooling an electronic component in a pressure washer includes positioning the electronic component in thermal contact with the second end cap of the main motor housing, conducting heat from the component to the end cap, and then transferring the heat from the end cap into water that flows through adjacent channels and cavities of the housing. This method enables the electronics to be cooled by the same water that is used to cool the motor, simplifying the thermal management system and eliminating the need for dedicated electronic cooling hardware.

Referring to FIGS. 7, 8, and 9, the pressure washer 8 includes a second end cap 18 that is attached to one end of the main motor housing 14. Mounted to the exterior surface of the second end cap are two printed circuit boards: a first printed circuit board 98 oriented parallel to the end cap, and a second printed circuit board 96 oriented perpendicular to it. These circuit boards support multiple electronic components 100, including at least first electronic component 102, second electronic component 104, third electronic component 106, and fourth electronic component 108, all of which generate heat during operation.

The method begins by mounting each electronic component to one of the circuit boards, with thermal contact established between the component and the second end cap 18. For components mounted to the parallel circuit board 98—such as components 102, 104, and 106—each component is thermally coupled to the second end cap using a respective heat conduit or flat plate. For example, as shown in FIG. 8, the first electronic component 102 is thermally connected to a flat heat-conductive plate 110. The bottom surface 118 of the plate 110 is placed in flush contact with the top surface 120 of the component 102. To reduce thermal resistance and improve heat transfer, a layer of thermally conductive grease may be applied between surfaces 118 and 120. The top surface 122 of the plate 110 is then positioned against a flat mating surface 124 of the second end cap 18. In this way, heat travels from the chip 102 into the plate 110, and from there into the second end cap, then the housing 14 and into the water flowing through the channels.

Second and third electronic components 104 and 106, also shown in FIG. 8, are mounted to the same circuit board and are thermally coupled to the second end cap in a similar manner using conductive plates 112 and 114. These plates also include flush mating surfaces at both ends, and thermally conductive grease may be applied between the component and the plate, and between the plate and the end cap, to maximize thermal efficiency.

For electronic components mounted to the perpendicular printed circuit board 96, a different configuration is used. The fourth electronic component 108 is thermally coupled to the second end cap via a heat conduit that extends upward from the component. The bottom surface of the component may be in direct contact with the bottom of the heat conduit, which in turn is mechanically fastened to a mounting pad 116 formed on the second end cap 18, as seen in FIGS. 8 and 9. The heat conduit serves the same function as the flat plates, conducting heat away from the component and into the end cap. Fasteners or adhesives may be used to ensure that the heat conduit remains in full contact with the mounting pad during operation.

Once the electronic components are mounted and thermally coupled to the second end cap, water is flowed through a series of flow channels formed along the outer surface of the main motor housing 14, as described in FIGS. 5 through 5E. These flow channels include first channel 22, second channel 24, third channel 26, fourth channel 28, and fifth channel 30. Between each adjacent pair of channels, the water changes direction via return channels such as return channels 36, 38, 40, and 42.

During these directional transitions, the water flows into and through one or more cavities formed in the second end cap 18. These cavities are optional but are strategically placed at return locations to increase water contact with the end cap. For example, cavities 70 and 72 are located where water flows from channel 22 to channel 24 through return channel 36. Cavities 66 and 68 are located between channels 24 and 26, and again between channels 26 and 28, associated with return channels 38 and 40. Cavities 64 and 66 are located between channels 28 and 30 for return channel 42. These features are clearly illustrated in FIG. 5B and described in detail in the written specification.

The cavities formed in the second end cap are fluidly connected to the return channels and form expanded spaces that increase the surface area between the flowing water and the thermally loaded end cap. As water flows into these cavities during its serpentine path, it absorbs heat that has been conducted from the electronic components into the second end cap. The flowing step of the method therefore includes directing water into these cavities to facilitate heat transfer.

As the water absorbs heat from both the motor housing and the second end cap, it continues through the flow path until it reaches the outlet 12, as shown in FIGS. 1 and 5A. The outlet may be connected to a nozzle or other attachment, and the heated water is expelled from the system under pressure.

Through this method, heat generated by the electronic components is transferred into the second end cap via direct physical contact with thermally conductive plates or heat conduits. That heat is then extracted from the end cap by the flowing water, which is already performing the function of cooling the motor. By integrating both motor and electronics cooling into a single water path and leveraging the geometry of the second end cap, the system enables effective thermal management without the complexity of separate fluid or air-cooled heat sinks.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of cooling a motor in a pressure washer, the method comprising:

enclosing the motor within a cavity formed in a main motor housing and sealed by first and second end caps;

flowing water through a series of flow channels formed at an outer portion of the main motor housing, the flow channels directing the water back and forth in alternating directions in a serpentine configuration;

transferring heat from the motor to the main motor housing;

transferring heat from the main motor housing to the water as it flows through the channels;

pressurizing and discharging the water flowing through the series of flow channels through an outlet, thereby simultaneously removing heat from the pressure washer generated by the motor and providing pressurized water; and transferring heat from one or more electronic components to the water via the second end cap.

2. The method of claim 1, further comprising redirecting the water between adjacent flow channels using return channels formed in one or more end caps.

3. The method of claim 1, wherein the channels are formed between parallel walls.

4. The method of claim 1, wherein the water flows into a return channel between the flow channels to redirect the flow of water in an opposite direction.

5. The method of claim 1 further comprising flowing water in opposite directions in immediately adjacent flow channels.

6. The method of claim 1, further comprising thermally coupling the one or more electronic components to the second end cap using a heat-conductive plate.

7. The method of claim 1, further comprising thermally coupling at least one electronic component to the second end cap using a heat conduit extending between the electronic component and a mounting pad on the second end cap.

8. The method of claim 1, wherein the water flowing through the series of flow channels comprises a single continuous flow of water that both removes heat from the motor and is subsequently pressurized for discharge through the outlet.

9. The method of claim 8, further comprising receiving the water at a first pressure, routing the water through the series of flow channels to absorb heat, and thereafter delivering the same water to a pump for pressurization.

10. The method of claim 9, wherein the water is routed directly from the series of flow channels to the pump without diversion into a separate cooling loop.

11. The method of claim 1, further comprising introducing water into the flow channels at a first pressure and subsequently pressurizing the same water to a higher pressure prior to discharge through the outlet.

12. The method of claim 11, wherein the water is cooled prior to pressurization by absorbing heat from the motor through the main motor housing.

13. The method of claim 1, wherein the series of flow channels is configured such that all water supplied to the outlet passes through the flow channels prior to pressurization.

14. The method of claim 1, wherein the water that removes heat from the motor is the same water that is discharged from the outlet for cleaning.

15. The method of claim 1, wherein the water sequentially performs a cooling function and a cleaning function within a single integrated fluid circuit.

16. The method of claim 1, wherein heat removed from the motor is carried by the same water that is subsequently pressurized and expelled for cleaning operations.

* * * * *